Dec. 5, 1933.  D. M. WELLMAN  1,938,506
VALVE GUIDE LUBRICATOR
Filed July 5, 1932  2 Sheets-Sheet 2
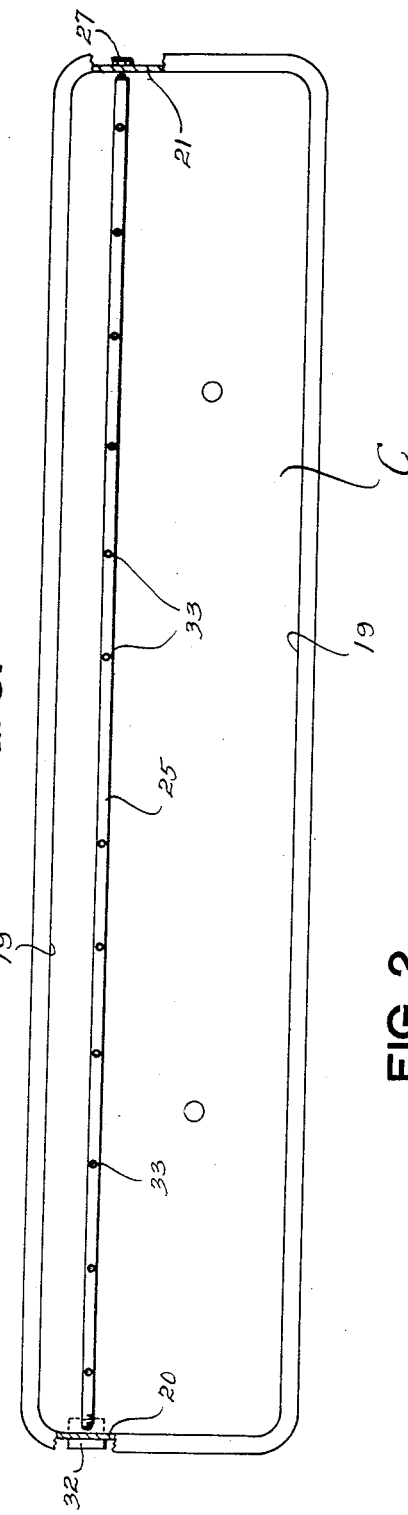
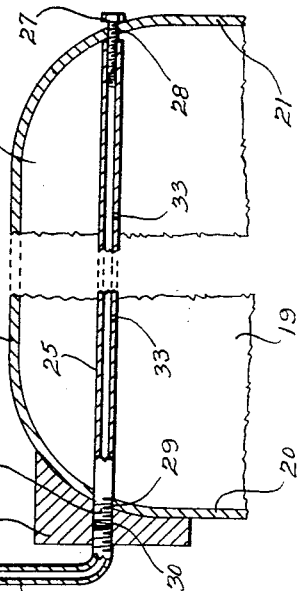
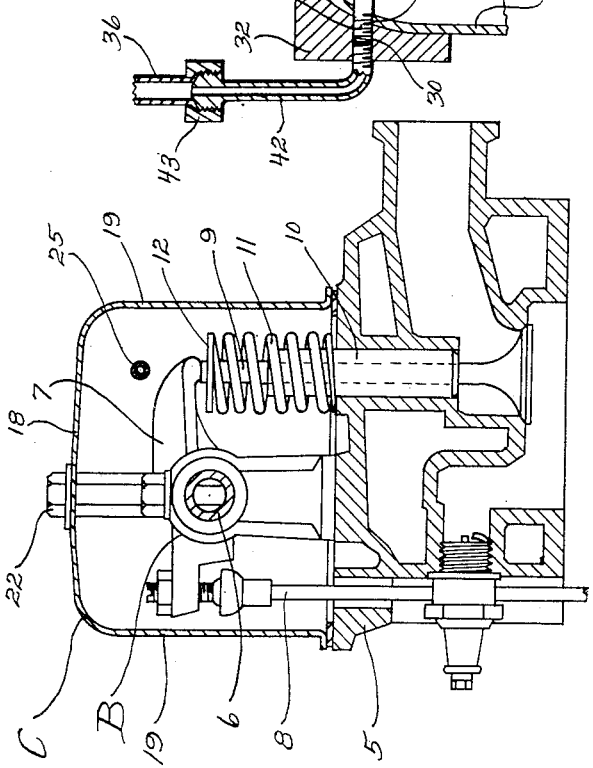
INVENTOR.
Davis M. Wellman
BY
ATTORNEYS.

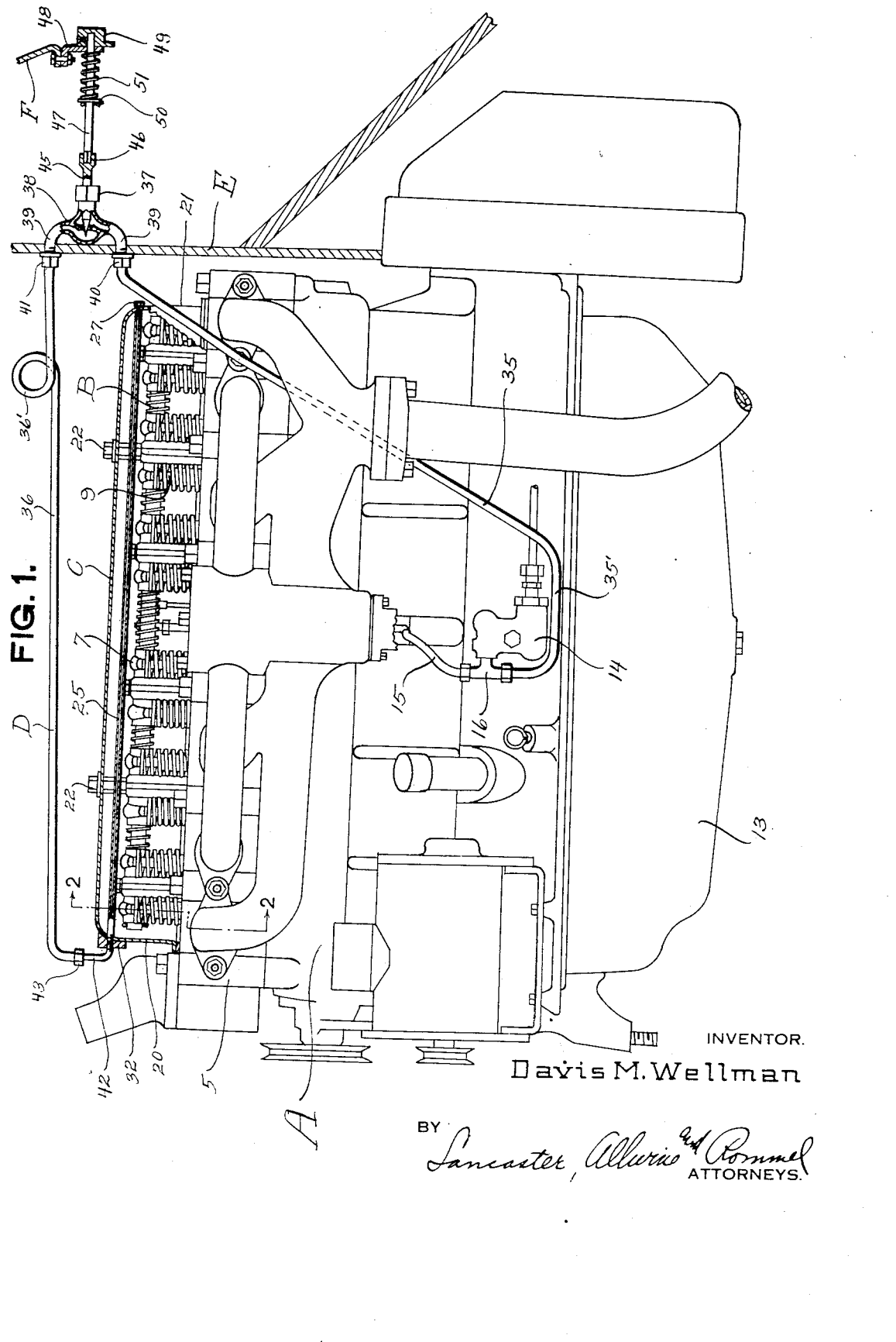

Patented Dec. 5, 1933

1,938,506

UNITED STATES PATENT OFFICE 1,938,506

VALVE GUIDE LUBRICATOR

Davis Milton Wellman, Aberdeen, S. Dak.

Application July 5, 1932. Serial No. 620,937

2 Claims. (Cl. 184—6)

The present invention relates to valve guide lubricating means for internal combustion engines of the valve in the head or overhead valve type and more particularly to that type of motor vehicle engine having a removable cover arranged over the valves and the operating means therefor.

In the usual lubricating systems of such types of motor vehicle engines, an oil pump is provided for delivering oil under pressure and thru an oil distributor to a hollow rocker shaft for lubricating the rocker arms pivoted thereon, with means being provided for delivering some of the oil to one end of the rocker arms which are adapted to be engaged by the push rods. The opposite ends of these rocker arms are adapted to bear upon the upper ends of the valve stems for unseating the valves, and no means is provided for efficiently lubricating these points of bearing contact of the rocker arms with the valve stems, or the guides in which the valve stems are movable.

It is therefore a primary object of the invention to provide means for efficiently lubricating the valve stems and guides of internal combustion engines of the valve in the head type, so as to prevent sticking of the valves and eliminating wear on the stems and rocker arms.

A further object of the invention is to provide a valve guide lubricator which may be readily associated with existing types of oiling systems for delivering a continuous and regulated supply of oil to the valve stems and guides while the engine is in operation.

A further object of the invention is to provide a valve guide lubricator embodying an oil distributor means associated with the cover for the valve operating means in a novel manner to deliver oil upon the upper ends of the valve stems for lubrication thereof.

Other objects and advantages of the invention will be apparent during the course of the following detailed description, taken in connection with the accompanying drawings forming a part of this specification and in which drawings:—

Figure 1 is a view in side elevation of a conventional type of internal combustion engine for motor vehicles and showing the lubricating device applied, the cover for the valve operating means being shown in section.

Figure 2 is an enlarged fragmentary section on the line 2—2 of Figure 1.

Figure 3 is a bottom plan view of the valve cover showing the oil distributor tube in place.

Figure 4 is an enlarged fragmentary sectional view taken longitudinally thru the valve cover and showing the manner of mounting the oil distributor tube in the ends of the cover.

In the drawings, and wherein similar reference characters designate corresponding parts throughout the several views, the letter A designates an internal combustion engine such as employed in motor vehicles and of the conventional valve in the head type provided with a valve operating means B. The letter C designates the usual removable cover enclosing the valve operating means B, while the letter D designates the valve stem and guide lubricator means forming the subject matter of this invention.

The valve operating means B which is arranged above the head block 5 of the engine embodies the usual hollow valve rocker shaft 6 having pivotally mounted thereon in spaced relation along the rocker shaft, the rocker arms 7. These rocker arms 7 are engaged at one end by the upper ends of push rods 8 pivoted upon the rocker shaft 6 and have their opposite ends engaging the upper ends of the valve stems 9 which are normally urged upwardly by the valve springs 11 acting against the washer 12.

An oil pump (not shown) delivers oil from the oil pan 13 to an oil distributor 14 having connected to the low pressure side thereof, an oil pressure pipe 15. This pipe 15 is connected to the hollow rocker shaft 6 and serves to lubricate the pivotal mountings of the rocker shafts and their point of contact with the push rods 8. In ordinary construction, the oil pressure pipe 15 is connected to the oil distributor 14 by an elbow coupling, and in applying the valve stem lubricator D, a T coupling 16 is substituted for this elbow coupling, to provide a second outlet from the low pressure side of the oil distributor.

The cover C is of elongated formation having the top wall 18, side walls 19, and front and rear end walls 20 and 21 respectively. These side and end walls round into the top wall 18 as clearly shown in Figures 2 and 4. The cover is secured to the upper side of the head block 5 over the valve operating means B by suitable bolts 22 and these bolts permit removal of the cover for inspection and adjustment of the valve means. As is usual practice, the engine A is mounted at a slight angle with the rear end of the engine slightly lower than the forward end of the engine.

The letter E may designate a dash at the rear end of the engine A, and F the instrument board of the vehicle in which the engine is mounted.

Referring now to the valve stem and guide lubricator means D, the same comprises a distributor pipe or tube 25 mounted longitudinally in the upper portion of the valve cover C and adjacent one side wall so as to extend directly above the line of valve stems 9. This distributor pipe 25 is externally threaded at its forward end as at 26 and at its rear end is internally threaded for receiving the threaded shank of a cap screw 27 extended thru an opening 28 in the rear wall 21 of the cover where it rounds into the cover top wall 18. The forward end of the pipe 25 extends thru an opening 29 formed in the upper portion of the front end wall 20 of the cover where it rounds into the cover top wall, and is threaded into a threaded opening 30 formed thru a coupling block 32. This coupling block 32 is formed with a concaved inner face conforming to the shape of the rounded upper portion of the front end wall 20 and may or may not be permanently secured to the cover. The pipe 25 is provided with a row of spaced apertures 33 which are so spaced as to be arranged one above each of the valve stems 9 where the stems are engaged by the rocker arms 7.

In assemblying the distributor pipe 25 in the cover C, the pipe may be turned tight into the opening 30 of the coupling block 32 so that the oil escape apertures 33 will be disposed at the lower side of the pipe when the coupling block properly engages the forward end of the cover. The pipe is then slid thru the opening 29 in the cover and the cap screw 27 threaded into the rear end of the pipe so as to form a closure therefore and also as a support for the rear end of the pipe. This also draws the coupling block 32 into engagement with the forward end of the cover with its concaved surface so engaging the rounded portion of the cover as to prevent rotation of the pipe and holds the pipe in a position with the apertures 33 directed downwardly. Thus it will be seen that the distributor pipe may be mounted in position over the valves by merely drilling two small openings in the end walls of the valve cover.

Referring now to the means for delivering a regulated amount of oil to the distributor pipe 25 from the oil distributor 14, the same comprises an oil line embodying the oil pipes 35 and 36 connected by a regulating valve 37. The regulating valve 37 is preferably in the form of a needle valve having its body portion 38 provided with parallel threaded coupling extensions 39 which extend thru suitable openings provided in the dash E. The oil pipe 35 is connected at one end to the T fitting 16 and has its opposite end connected to the lower coupling extension 19 of the regulating valve by the coupling nut 40. The oil pipe 36 is connected at one end to the upper coupling extension of the regulating valve by the coupling nut 41 and extends forwardly from the dash E with its forward end connected to an elbow coupling 42 by the flanged coupling nut 43. This elbow coupling 42 has its opposite arm threaded into the outer end of the threaded opening 30 formed thru the coupling block 32.

The pipe 35 is provided with a bend or loop 35', while the pipe 36 is provided with a coil or loop 36' and these loops serve to relieve strain upon the coupled ends of the pipes caused by slight relative movements of the engine A and dash E.

The stem 45 of the regulating valve 37 is provided at its rear end with a square socket 46 which slidably receives the squared end of a control rod 47 whereby the operator may regulate the amount of oil fed to the valves of the engine. The rear end of this control rod 47 is rotatable in a suitable bracket 48 secured to the lower edge of the instrument board F, and a suitable knob 49 is affixed to the rear end of the rod for manually adjusting the valve 37. Encircling the rod 47, with one end engaging the rear side of the bracket 48 and its opposite end acting against a stop washer 50 on the rod, is a coil spring 51 which normally urges the knob 49 against the bracket with sufficient force to prevent rotation of the control rod by vibration. The sliding fit of the rear end of the control rod in the socket 46 will permit of this frictional engagement of the knob 49 with the bracket 48 and also compensate for slight variations in the spacing between the dash E and instrument board F, as well as relative movement of the portions E and F.

In operation, when the engine is running, a portion of the oil delivered to the oil distributor 14 by the oil pump of the engine is forced thru the pipe 35, regulating valve 37 and pipe 36 into the forward end of the distributor pipe 25 where it is permitted to escape thru the apertures 33 arranged one above each of the valve stems 9. This escape of oil from the distributor pipe furnishes a continuous supply of oil for lubricating the points of bearing contact of the rocker arms with the upper ends of the valve stems and as an efficient lubricating means for the movement of the valve stems in the guides 10.

When desiring to remove the cover C it is only necessary to unscrew the coupling nut 43 serving to connect the oil pipe 36 to the elbow 42. By having the oil enter the distributor pipe 25 at the front end of the cover C also allows for feeding of a sufficient quantity of the oil at the rear end of the distributor pipe owing to the slight rearward and downward inclination of the pipe. This gravity feeding of the oil due to the angle of the distributor pipe is desirable because of the fact that the oil pipe 35 is connected to the low pressure side of the oil distributor 14.

Thus it will be seen that a lubricator means for the valve stems and their guides has been provided whereby sticking and wearing of the stems and guides will be eliminated. It will also be seen that a novel arrangement has been disclosed whereby an oil distributor pipe may be mounted in an ordinary form of valve cover in such relation to the valves as to insure positive lubrication thereof.

Changes in details may be made to the form of invention herein shown and described, without departing from the spirit of the invention or the scope of the following claims.

I claim:

1. The combination with the valve cover of a valve in the head motor, of an apertured oil distributor pipe disposed longitudinally in the upper portion of the cover and having an externally threaded end projecting thru one end of the cover, a cap screw extended thru the opposite end of the cover and threaded into the opposite end of the pipe and forming a closure therefor, a coupling block externally of the cover and having an opening for threaded reception of the externally threaded end of the pipe, a fitting threaded into the opening, and an oil line connected to said fitting.

2. The combination with the valve cover of a valve in the head motor, of valve stem lubricating means comprising an apertured oil distributor pipe arranged longitudinally in the upper portion of the cover, said pipe having an externally threaded end projecting thru one end of the cover and an internally threaded end arranged inwardly of the opposite end of the cover, a set screw extended thru the cover and threaded into the internally threaded end of the pipe, a coupling block having a threaded opening for receiving the externally threaded end of the pipe, a fitting threaded into said opening, and an oil pressure line connected to said fitting for delivering oil into the distributor pipe.

DAVIS MILTON WELLMAN.